(12) United States Patent
Muirhead et al.

(10) Patent No.: US 12,273,853 B2
(45) Date of Patent: Apr. 8, 2025

(54) ARRANGEMENT AND METHOD FOR ADDRESSING AND LOCATING EQUIPMENT

(71) Applicant: Lufthansa Technik AG, Hamburg (DE)

(72) Inventors: Andrew Muirhead, Norderstedt (DE); Craig Depner, Washington, WA (US); Cornelis Broers, Hamburg (DE)

(73) Assignee: LUFTHANSA TECHNIK AG, Hamburg (DE)

(*) Notice: Subject to any disclaimer, the term of this patent is extended or adjusted under 35 U.S.C. 154(b) by 477 days.

(21) Appl. No.: 17/798,564

(22) PCT Filed: Feb. 17, 2021

(86) PCT No.: PCT/EP2021/053890
§ 371 (c)(1),
(2) Date: Aug. 10, 2022

(87) PCT Pub. No.: WO2021/165321
PCT Pub. Date: Aug. 26, 2021

(65) Prior Publication Data
US 2023/0113189 A1 Apr. 13, 2023

(30) Foreign Application Priority Data
Feb. 18, 2020 (EP) .................................. 20158070

(51) Int. Cl.
*H04B 7/00* (2006.01)
*H04B 7/08* (2006.01)
(Continued)

(52) U.S. Cl.
CPC .......... *H04W 64/006* (2013.01); *H04B 7/082* (2013.01); *H04B 17/318* (2015.01); *H04W 8/26* (2013.01)

(58) Field of Classification Search
CPC ........ H04B 1/318; H04B 1/38; H04B 17/082; H04W 64/006; H04W 8/26; H04W 4/80; H04W 4/029; H04W 4/42
See application file for complete search history.

(56) References Cited

U.S. PATENT DOCUMENTS 7,496,361 B1 2/2009 Mitchell et al.
8,635,654 B2 * 1/2014 Correa ................. H04N 21/439
725/76

(Continued)

FOREIGN PATENT DOCUMENTS

EP 2278352 A2 1/2011
EP 3241748 A1 11/2017

*Primary Examiner* — Tuan Pham
(74) *Attorney, Agent, or Firm* — LEYDIG, VOIT & MAYER, LTD.

(57) ABSTRACT

An arrangement provides addressing for a plurality of equipment. Each piece of the equipment is non-varyingly logically linked to a corresponding transceiver having a unique identifier and a plurality of transceiver antennae with non-identically oriented antenna lobes. Each corresponding transceiver is configured to transmit a signal having the unique identifier associated with the transceiver via each of the transceiver antennae individually and to receive any signal of a neighboring transceiver attributing it to the actually receiving transceiver antennae in order to determine pattern information pairs. A central instance is configured to collect the pattern information pairs from the transceiver transceivers and to compare the pattern information pairs with a stored pattern of the equipment to identify each transceivers' position in the stored pattern.

16 Claims, 7 Drawing Sheets

(51) Int. Cl.
    *H04B 17/318*     (2015.01)
    *H04W 8/26*     (2009.01)
    *H04W 64/00*     (2009.01)

(56) References Cited

U.S. PATENT DOCUMENTS

| | | | |
|---|---|---|---|
| 9,241,137 B2 * | 1/2016 | Frisco | H04N 21/41422 |
| 2005/0062595 A1 * | 3/2005 | Hofbeck | B60N 2/0027 |
| | | | 340/457.1 |

* cited by examiner

| Location | Codes | WAP | Location | Codes | WAP | Location | Codes | WAP |
|---|---|---|---|---|---|---|---|---|
| 1A | 1a-0<br>1b-2d<br>1c-7a<br>1d-0 | WAP_1 | 2A | 7a-1c<br>7b-8d<br>7c-13a<br>7d-0 | WAP_1 | 3A | 13a-7c<br>13b-14d<br>13c-0<br>13d-0 | WAP_1 |
| 1C | 2a-0<br>2b-3d<br>2c-8a<br>2d-1b | WAP_1 | 2C | 8a-2c<br>8b-9d<br>8c-14a<br>8d-7b | WAP_1 | 3C | 14a-8c<br>14b-15d<br>14c-0<br>14d-13b | WAP_1 |
| 1D | 3a-0<br>3b-4d<br>3c-9a<br>3d-2b | WAP_1 | 2D | 9a-3c<br>9b-10d<br>9c-15a<br>9d-8b | WAP_1 | 3D | 15a-9c<br>15b-16d<br>15c-0<br>15d-14b | WAP_1 |
| 1F | 4a-0<br>4b-5d<br>4c-10a<br>4d-3b | WAP_1 | 2F | 10a-4c<br>10b-11d<br>10c-16a<br>10d-9b | WAP_1 | 3F | 16a-10c<br>16b-17d<br>16c-0<br>16d-15b | WAP_1 |
| 1H | 5a-0<br>5b-6d<br>5c-11a<br>5d-4b | WAP_1 | 2H | 11a-5c<br>11b-12d<br>11c-17a<br>11d-10b | WAP_1 | 3H | 17a-11c<br>17b-18d<br>17c-0<br>17d-16b | WAP_1 |
| 1K | 6a-0<br>6b-0<br>6c-12a<br>6d-5b | WAP_1 | 2K | 12a-6c<br>12b-0<br>12c-18a<br>12d-11b | WAP_1 | 3K | 18a-12c<br>18b-0<br>18c-0<br>18d-17b | WAP_1 |

Fig. 5

| Time | t1 | t2 | t3 | t4 |
|------|----|----|----|----|
| m-a | 3c | 4c | 5c | 6c |
| m-b | 0 | 0 | 0 | 0 |
| m-c | 9a | 10a | 11a | 12a |
| m-d | 0 | 0 | 0 | 0 |

| Location | | | | |
|----------|------|------|------|------|
| Row | 1-m-2 | 1-m-2 | 1-m-2 | 1-m-2 |
| Column | C | D | E | F |

Fig. 7

ARRANGEMENT AND METHOD FOR ADDRESSING AND LOCATING EQUIPMENT

CROSS REFERENCE TO RELATED APPLICATIONS

This application is a U.S. National Phase application under 35 U.S.C. § 371 of International Application No. PCT/EP2021/053890, filed on Feb. 17, 2021, and claims benefit to European Patent Application No. EP 20158070.1, filed on Feb. 18, 2020. The International Application was published in English on Aug. 26, 2021 as WO 2021/165321 A1 under PCT Article 21(2).

FIELD

The present disclosure relates to an arrangement and a method for addressing equipment, especially seat-mounted electrical equipment, e.g. inflight-entertainment units, in an aircraft cabin.

BACKGROUND

Electrical equipment installed in aircraft cabin seats must be uniquely identified via a so-called addressing system in order to determine which equipment is installed in a specific seat. This addressing is required for various purposes, e.g. for assigning reading lights to individual seats for on/off control by the passenger or crew, for assigning passenger call requests to individual seats so that the crew knows which passenger has activated the call, for remote control of seat functions by the crew such as resetting the equipment to standard settings and/or for providing personalization to the passenger at a specific seat by assigning their mobile device and an application executed thereon to the specific seat the passenger is sitting in.

Current Inflight Entertainment (IFE) and Cabin Management Systems (CMS) use the so-called wired daisy chain addressing method to address individual seat equipment. In this method, the seats installed in one column of a predetermined zone, e.g. all left-hand windows seats in each row in economy class, are connected in a daisy chain. The so-called seat-to-seat cables provide the required power and data feeds to each seat column.

The central system controller or the zone controller is then responsible to determine an address for each equipment installed in a seat in the column, i.e. an allocation of the equipment to a specific seat and/or seat number. For this, the central system controller usually first builds an overall seat map starting with the first seats in a column and working through to the last seats in a column on a previous neighbor, next neighbor methodology. In this process, the unique identifiers of each seat equipment (such as a seat electronic box or smart in-seat monitor) are collected. Following this, a software token is passed down the column, so that the central controller knows which device has the token. A seat number can then be assigned to said equipment according to a pre-defined database.

Even though, addressing of equipment is reliably possible with the wired daisy chain addressing method requires, this method relies on mandatory data cable connection between the pieces of equipment to be addressed. These data cables add significant weight to the empty weight of an aircraft.

In current developments, at least some of the data-intensive equipment in an aircraft seat is wirelessly connected to the cabin management and inflight entertainment system, thus only a power connection is required. With wireless equipment, however, the wired daisy chain addressing method can no longer be applied for addressing the equipment.

Since multiple attempts to create an automated seat map for wireless cabin systems have failed due to the inability to uniquely identify the individual locations of the seats reliably, the addressing currently often relies on manual input of seat locations into the individual smart display units at each seat, or via QR-Codes generated at each seat and then manual assignment to the seat map. However, this manual input of seat locations into the individual smart display units at each seat, or via QR-Codes generated at each seat and then manual assignment to the seat map require a great deal of manual labor, which is both a costly and timely exercise when over 300 seats—as typical for modern aircrafts—are required to be addressed.

SUMMARY

In an embodiment, the present disclosure provides an arrangement that provides addressing for a plurality of equipment. Each piece of the equipment is non-varyingly logically linked to a corresponding transceiver having a unique identifier and a plurality of transceiver antennae with non-identically oriented antenna lobes. Each corresponding transceiver is configured to transmit a signal having the unique identifier associated with the transceiver via each of the transceiver antennae individually and to receive any signal of a neighboring transceiver attributing it to the actually receiving transceiver antennae in order to determine pattern information pairs. A central instance is configured to collect the pattern information pairs from the transceiver transceivers and to compare the pattern information pairs with a stored pattern of the equipment to identify each transceivers' position in the stored pattern.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 5 shows a table comprising the pattern information pairs of FIG. 4;

FIG. 7 shows the information recorded and determined by the portable device according to FIG. 6 during movement.

DETAILED DESCRIPTION

Figure 1:
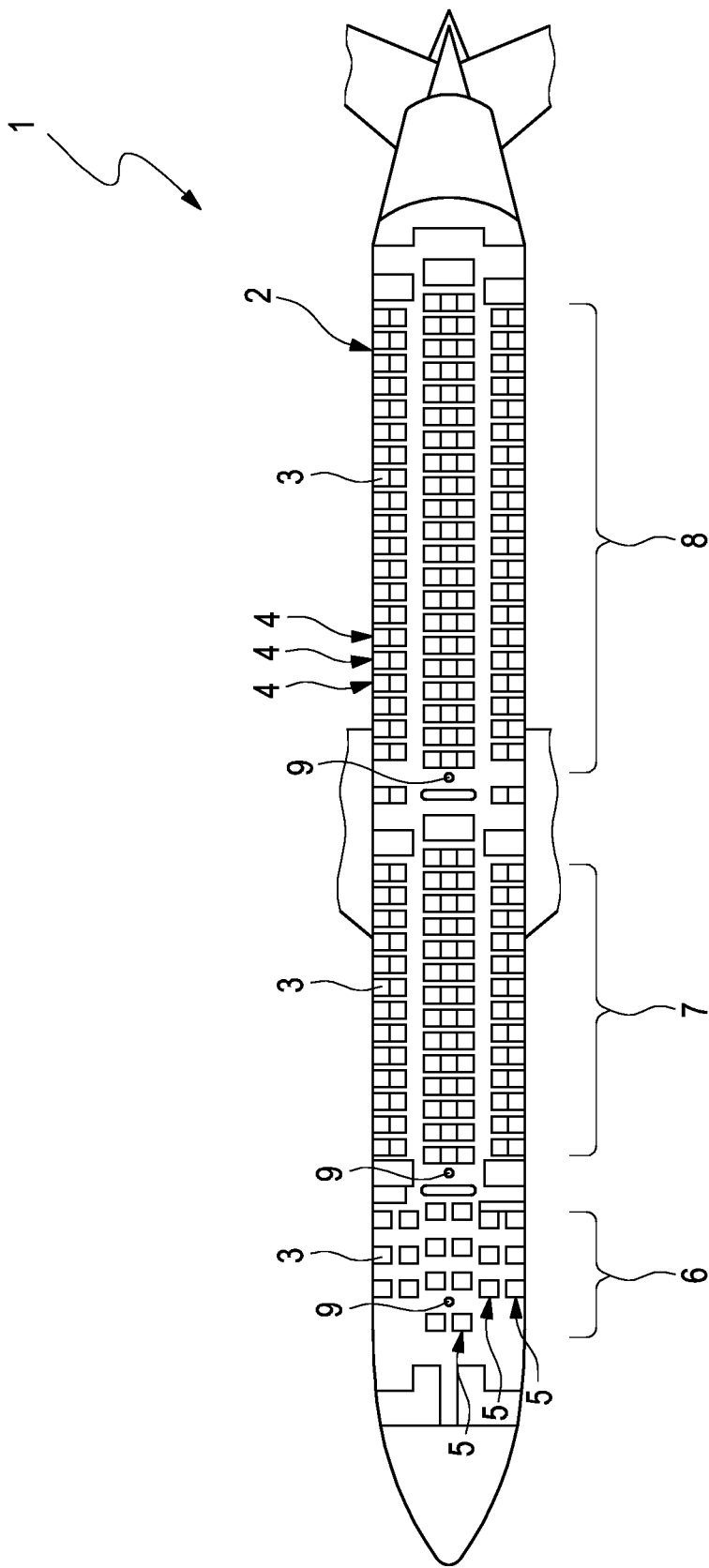
FIG. 1 shows a schematic drawing of the layout of an aircraft cabin.

Aspects of the present disclosure provide an improved arrangement and method for addressing equipment, e.g. in an aircraft cabin, which at least in part counter the disadvantages of the current state of the art.

An aspect of the present disclosure provides an arrangement for addressing equipment, wherein each piece of equipment is non-varyingly logically linked to a transceiver device having a unique identifier and a plurality of transceiver antennae with non-identically oriented antenna lobes, wherein the transceiver device is configured to transmit a signal comprising its unique identifier via each of the transceiver antennae individually and to receive any signal of a neighboring transceiver device attributing it to the actually receiving transceiver antennae in order to determine pattern information pairs, and a central instance is configured to collect the pattern information pairs from the transceiver devices and to compare the pattern information pairs with a stored pattern of the equipment to identify each transceiver devices' position in the stored pattern.

Furthermore, an aspect of the present disclosure provides a method for addressing equipment, wherein each piece of equipment is non-varyingly logically linked to a transceiver device having a unique identifier and a plurality of transceiver antennae with non-identically oriented antenna lobes, comprising the steps:

Each transceiver device transmitting a signal comprising its unique identifier via each of the transceiver antennae individually;

Each transceiver device receiving signals of a neighboring transceiver device and attributing it to the actually receiving transceiver antennae;

Each transceiver device determining pattern information pairs based on the received signals;

Collecting the pattern information pairs from the plurality of transceiver devices; and Comparing the pattern information pairs with a stored pattern of the equipment to identify each transceiver devices' position in the stored pattern.

As used herein, a "transceiver device" is a device capable of both transmitting and receiving radio waves. The transmission and receiving section of the device may be fully integrated with one another or they constitute separate modules linked together.

Similarly a "transceiver antenna" is an antenna suitable both for transmitting and receiving radio waves. The transmitting and received can be achieved by the same structural antenna or the transceiver antenna comprises two separate antennae for transmitting and receiving.

Each transceiver antenna has a "main lobe" both containing the highest power when transmitting a signal as well as the highest sensitivity for receiving signals. While the antenna lobes for transmitting and receiving of a single transceiver antenna shall be identical, the antenna lobes of two different transceiver antenna shall not, meaning that even tough certain overlaps might be allowable, there is at least one point in space where the signal of a first transceiver antenna may be received while the signal of a second transceiver antenna may not. Similarly, there is at least one point in space when transmitting a signal therefrom, the signal can only be detected by a first transceiver antenna but not a second one.

A "unique identifier" is an identifier which is guaranteed to be unique among all identifiers used for transceiver devices at least in the arrangement. They may comprise serial and/or random numbers and are suitable to be digitally stored and transmitted.

In the arrangement, each piece of equipment to be addressed is non-varyingly logically linked to one transceiver device, thus allowing an unambiguous mapping of the equipment to a transceiver device and its unique identifier. The transceiver device may be a separate unit or may be integrated into a piece of equipment. Multiple pieces of structurally linked equipment might be logically linked to the same transceiver device. For example, various pieces of equipment in a single seat might be linked to a single transceiver device of said seat, which might nevertheless be integrated with one of said pieces of equipment. Since the pieces of equipment are fixedly installed on the same structural seat as the transceiver device, they can be regarded to be non-variably logically linked.

The transceiver device comprises plurality of transceiver antennae with non-identically oriented antenna lobes. With these antennae, the transceiver device can send out signals in a specific direction, i.e. according to the orientation of the antenna lobes of the antennae, and receive respective signals of other transceiver devices with the possibility to determine the direction the signals come from by monitoring which antenna actually received the signal. The plurality of transceiver antennae can also be simulated by a single antenna that is pivotably mounted to be swiveled to provide said a plurality of orientations. The swivel movement of the antenna between various transceiver devices might has to be synchronized on order to ensure the signal transmitted by one transceiver device to be received by a neighboring transceiver device.

The transceiver device is configured to transmit a signal comprising its unique identifier via each of the transceiver antennae individually. "Individually" in this context refers to the signals being sent via the different antennae being clearly distinguishable from each other as to which antenna is actually used for transmission. This can be achieved by various measures and combinations thereof.

In one embodiment, the transceiver device is configured to send a signal consecutively via the different antennae so that only one antenna at a time transmits a signal. The different antennae can be assigned to distinct time slots for transmitting said signal, potentially allowing a receiving transceiver device to draw conclusions on which antennae of the signal transmitting transceiver has actually transmitted the received signal. For this, e.g. a time lag to a reference signal might be used.

In another embodiment, the transmitted signal might not only comprise the unique identifier of the transceiver device but also a clear and unique identification via which transceiver antennae of the device a specific signal is actually transmitted. It is generally sufficient for the antenna identification of a transceiver device to be unique. However, it is preferred that the antenna identification is associated with additional information, e.g. the relative direction of the main lobe of antenna in respect to the equipment or the object the equipment is installed in. For example, an antenna of the transceiver device might be associated with the forward direction of the seat when properly installed in an aircraft cabin, with the identification of said antenna reflecting same.

As mentioned before, the various measures to ensure the individual transmission of signals over the various antennae of a transceiver device may be combined. The transmission of signals over the various antennae of one or multiple transceiver devices may be initiated by a central instance. The central instance may also be configured to control the actual transmission of a signal by the individual antennae of a transceiver device, i.e. the central instance may control a specific transceiver device to transmit a signal over a certain antenna.

In case the transceiver device are not constantly capable of detecting a signal received by one of the transceivers device's respective antennae, the central instance might also be configured to activate and deactivate a "listening mode"

of the transceiver devices, in which a transceiver device is indeed capable of detecting a signal received by one of its antennae.

A transceiver device receiving a signal transmitted from a neighboring transceiver device determines a pattern information pair based on this signal. The pattern information pair comprises the unique identifier of the neighboring transceiver device having transmitted the signal by extracting the same from the signal received, the unique identifier of the transceiver device having received said signal as well as the clear and unique identification, over which transceiver antenna said signal was received. In case the received signal comprises information about the actual antenna used by the neighboring transceiver device for the transmission, this information is also stored in the corresponding pattern information pair.

Dependent on the configuration of the transceiver device, a signal might be received by two antennae simultaneously. This hints at the transmitting transceiver device being located within an area of overlap between the antenna lobes of said two antennae, which might be indicated accordingly in the pattern information pair.

The pattern information pairs determined by the various transceiver devices are collected by a central instance. For this the pattern information pairs are sent the central instance. In case the transceiver device is equipped to connect to a wireless network for data exchange, e.g. WLAN, or an equipment the transceiver device is connected to is configured to relay information from the transceiver device to the central instance, e.g. via a wireless network, the pattern information pairs may be send over the respective network to the central instance. The transceiver devices may constitute a mesh network passing the pattern information pairs of one transceiver device along until it reaches the central instance.

In the central instance, the collected pattern information pairs are analyzed in order to determine the relative position of all transceiver devices to each other. These relative positions are then compared with a stored pattern of the equipment to identify each transceiver devices' position in said stored pattern. The stored pattern is a digital representation of the general configuration of the equipment. For example, in an aircraft cabin the actual arrangement of seat each having at least on piece of equipment to be addressed installed is generally known and available as a digital model. Assuming each seat being provided with at least one transceiver device due to its installed equipment, the collected pattern information pairs should result in a relative position pattern of the seats comparable to the stored pattern. By superimposing the relative position pattern with the stored pattern the transceiver devices' position in the latter can be determined. In case the number of transceiver devices for which relative positions are available differs from the number of equipment according to the stored pattern, an error might be output.

Based on the determined transceiver devices' position in the stored pattern the mapping of the equipment linked thereto as well as to the actual seat and its seat number is easily doable. The equipment might inherit the unique identifier of the transceiver device it is linked to as its address, which is then only be mapped to the seat number according to the determined position of the transceiver device in the stored pattern.

It is preferred that each transceiver device has four antennae, whose antenna lobes are oriented in 90 degree steps in a common plane. Preferably the lateral expansion of the antenna lobe of each of the antennae is limited to 90 degrees as well so that there is no overlap between two adjacent antenna lobes. Such transceiver device are generally sufficient to address equipment arranged in a basically two-dimensional, even and/or rectangular pattern, e.g. seat equipment in aircraft cabins. Of course, by providing additional transceiver antennae increases the granularity of the pattern information pairs and can lead to improved results in more complex patterns.

As mentioned, the signals sent by a transceiver device preferably comprise a unique identification of the transceiver antenna it has been transmitted from. While this unique identification may be chosen arbitrarily, it is preferred if the unique identification of at least one transceiver antenna reflects the assumed orientation of the transceiver device. For example, for a transceiver device fixedly installed in a seat, the unique identification of the antenna facing forward in relation to the seat may comprise the information of being faced forward.

In a preferred embodiment, the transceiver device is configured to determine the signal strength of received signals and pattern information pairs are only determined for signals with relative maximum signal strength at a specific transceiver antenna and/or with a signal strength above a predetermined threshold. If only the strongest signal received by a specific antenna of the transceiver device is used for determining a pattern information pair, it can be ensured that said pattern information pair reflects the actual neighboring relationship between two transceiver devices. More remote and thus not neighboring devices are ignored due to their signal strength not being the maximum signal strength. Of course, the maximum signal strength has to be determined individually for each transceiver antenna. Similarly or in addition, signals below a certain threshold might be ignored when determining pattern information pairs, thus precluding the assumption of a neighboring relationship with a too remote transceiver device.

In some cases, e.g. in aircraft cabins, the stored pattern might comprise several separate sub-patterns that are too distant to each other for the transceiver devices to interconnect. For example, seats in economy class of an aircraft which are separated by a galley may constitute sub-patterns, wherein the transceiver devices of the last row of the forward sub-pattern might not receive signals from the transceiver devices of the first row of the aft sub-pattern. Especially in case two sub-patterns are identical, it might not be possible to unambiguously determine the position of the transceiver devices in the pattern solely based on the pattern information pairs. It is thus preferred that an access point for wireless network is provided and that at least for the transceiver device having direct or indirect access to said wireless network, the signal strength within the wireless network at a defined access point, e.g. wireless router, is determined. "Indirect access" relates to transceiver devices being connected to close equipment with access to the wireless network, whose network capabilities are shared with the transceiver device. In case of a plurality of identical sub-patterns at different distances from the access point, said signal strength may be used to unambiguously assign at least one of the transceiver device with connection to the wireless network to one of the sub-patterns. Alternatively or in addition, in case a plurality of access points is provided, the position of the individual access points and information which transceiver device being connected to which access point, may provide comparable information, since it may be assumed that each transceiver device connects to the access point closest to it due to best signal strength.

It is preferred that the transceiver antenna are configured for a UHF-Band, i.e. they transmit and receive signals in a Band within the frequency range of 300 MHz and 3 GHz.

Apart from wirelessly addressing equipment, aspects of the present disclosure provide a considerable bonus effect.

By supplementing the inventive arrangement—possibly even with the central instance removed, e.g. after the processing of equipment has been completed—a portable device configured to receive the signals transmitted by the transceiver devices and to match the received signals with the determined transceivers positions and/or the pattern information pairs accessible to the portable device, the position of the portable device relative to the transceiver devices can be established. The portable device can thus help to identify a specific equipment or seat by determine it being close to the transceiver device logically linked to the equipment or seat searched for.

Thus, in addition to addressing equipment, if individual equipment and/or seats in e.g. the cabin of an aircraft can be located via a portable device, maintenance and service functions can be simplified by the correct data being assigned to the correct seat as the maintenance or service crew is standing near the respective seat. For example, if a service crew needs to know which passenger is sitting in a particular seat, their portable device could display the information automatically if the individual seat could be located and identified without them having to enter any data into the application themselves. Currently such localization is not possible as e.g. a crew member standing at seat 23C still has to scroll through their paper or device, or enter the seat number into the application in order to be able to identify the name of the passenger. Localization of the crew member relative to the passenger is currently not available via existing methods and becomes possible by utilizing the transceiver devices already present for addressing equipment.

While the localization of the portable device is generally possible with a single unidirectional antenna, in a preferred embodiment the portable device has at least four antennae, whose antenna lobes are oriented in 90 degree steps in a common plane and/or perpendicular thereto, wherein preferably the lateral expansion of the antenna lobes of each of the antennae is limited to 90 degrees. This way, the portable device can receive signals from various identifiable direction allowing more precise locating.

The portable device can comprise a memory in which the determined transceivers positions and/or the pattern information pairs are locally stored. The portable device may be wirelessly connected to a database and/or the central instance providing the required information on the spot.

The portable device may also transmit a beacon signal which is then received by the various transceiver devices in its surroundings. By analyzing which antenna of which transceiver device actually received said beacon signal, it is possible for the central instance to determine the portable devices position, which, if necessary, may then be relayed to the portable device. For this external determination of the portable device's position, it is generally sufficient for the portable device to transmit its beacon signal via a unidirectional antenna. For explanation of the inventive method it is referred to the above.

FIG. 1 shows a typical aircraft 1 cabin 2 layout comprising seats 3 that are arranged in rows 4 and columns 5. Furthermore, the cabin 2 is divided into three different zones 6, 7, 8 in accordance with three different flight classes. Each of the zones 6, 7, 8 has at least one wireless access point 9 assigned thereto, providing a wireless network according to the well-established IEEE 802.11 standard through the cabin 2.

Figure 2:
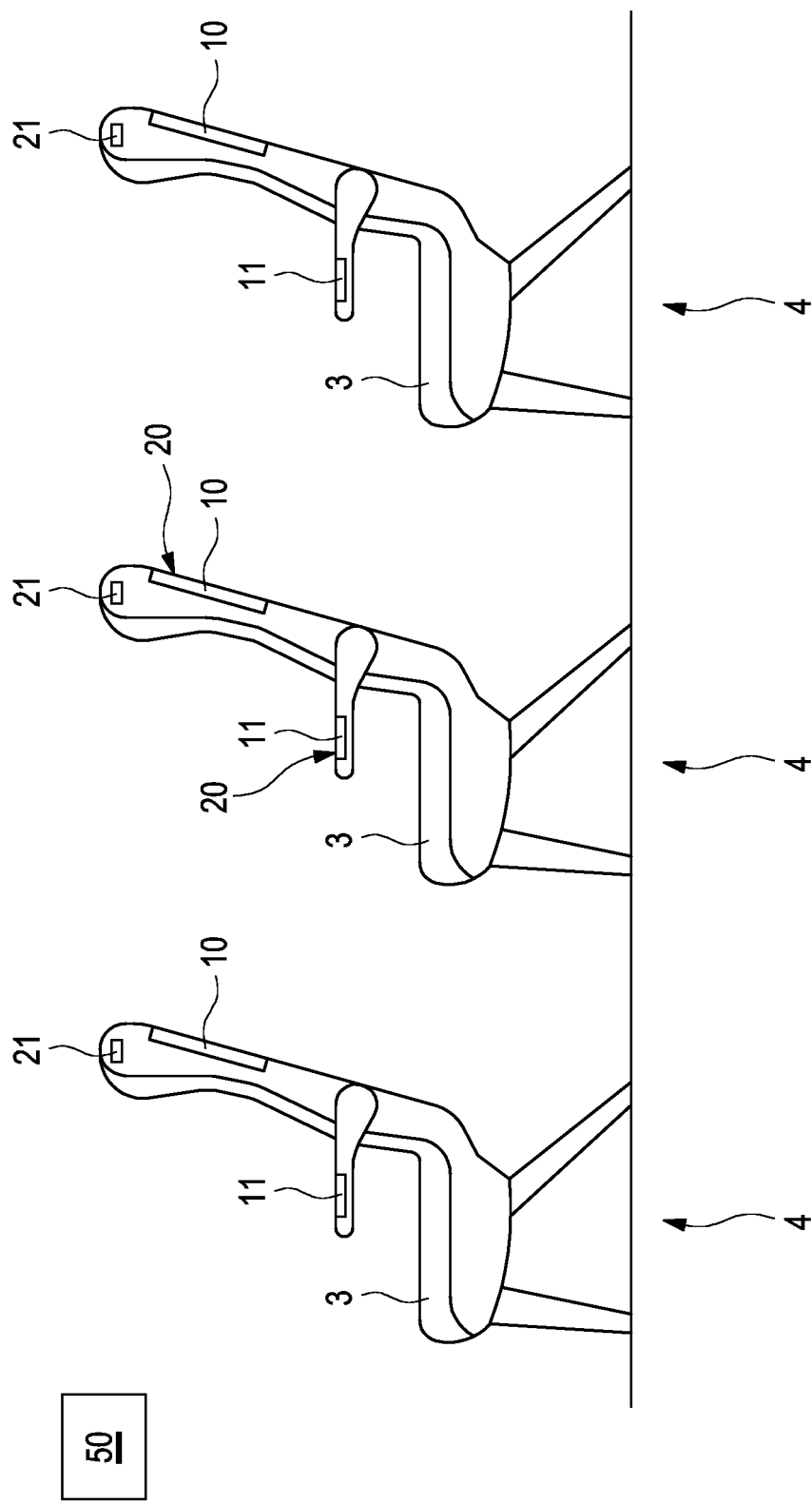
FIG. 2 shows a schematic partial side view of the arrangement according to FIG. 1.

In FIG. 2, three seats 3 in three consecutive rows 4 are schematically shown. Each seat 3 as an inflight entertainment module 10 installed, whose screen is viewable from the seat 3 behind. The inflight entertainment module 10 is wirelessly connected to the access point 9 of the zone 6, 7, 8 the seat 3 is located in for receiving video data etc.

In it armrest 3', the seat 3 is equipped with a remote control 11 to control the inflight entertainment module 10 viewable from the seat 3, i.e. the inflight entertainment module 10 of the seat 3 in front. The remote control 11 is also wirelessly connected to the access point 9 of the respective zone 6, 7, 8 and the sends its commands via this network connection.

In order to for the remote control 11 to manipulate the correct inflight entertainment module 10, it is necessary to determine the relative position of the inflight entertainment modules 10 and remote controls 11 and subsequently forward a comment by a remote control 11 at one seat 3 to the inflight entertainment module 10 of the seat 3 in front. Any feedback to the remote control 11 is also be forwarded to the correct remote control 11.

The remote control 11 and the inflight entertainment modules 10 installed on the very same seat 3 may be seen as equipment 20. Each seat 3 also comprises a transceiver device 21. Since the transceiver device 21 is mounted to the same seat 3, the equipment 20 affixed to the same seat 3 can be regarded as non-varyingly logically linked to said transceiver device 21. The logical links between pieces of equipment 20 with respective transceiver devices 21 is be stored in a mapping table based on e.g. unique identifiers or MAC-addresses of the various components.

Within the cabin 2, e.g. as part of the cabin management system, a central instance is provided, which is data-connected to the wireless network established by the access points 9.

Figure 3:
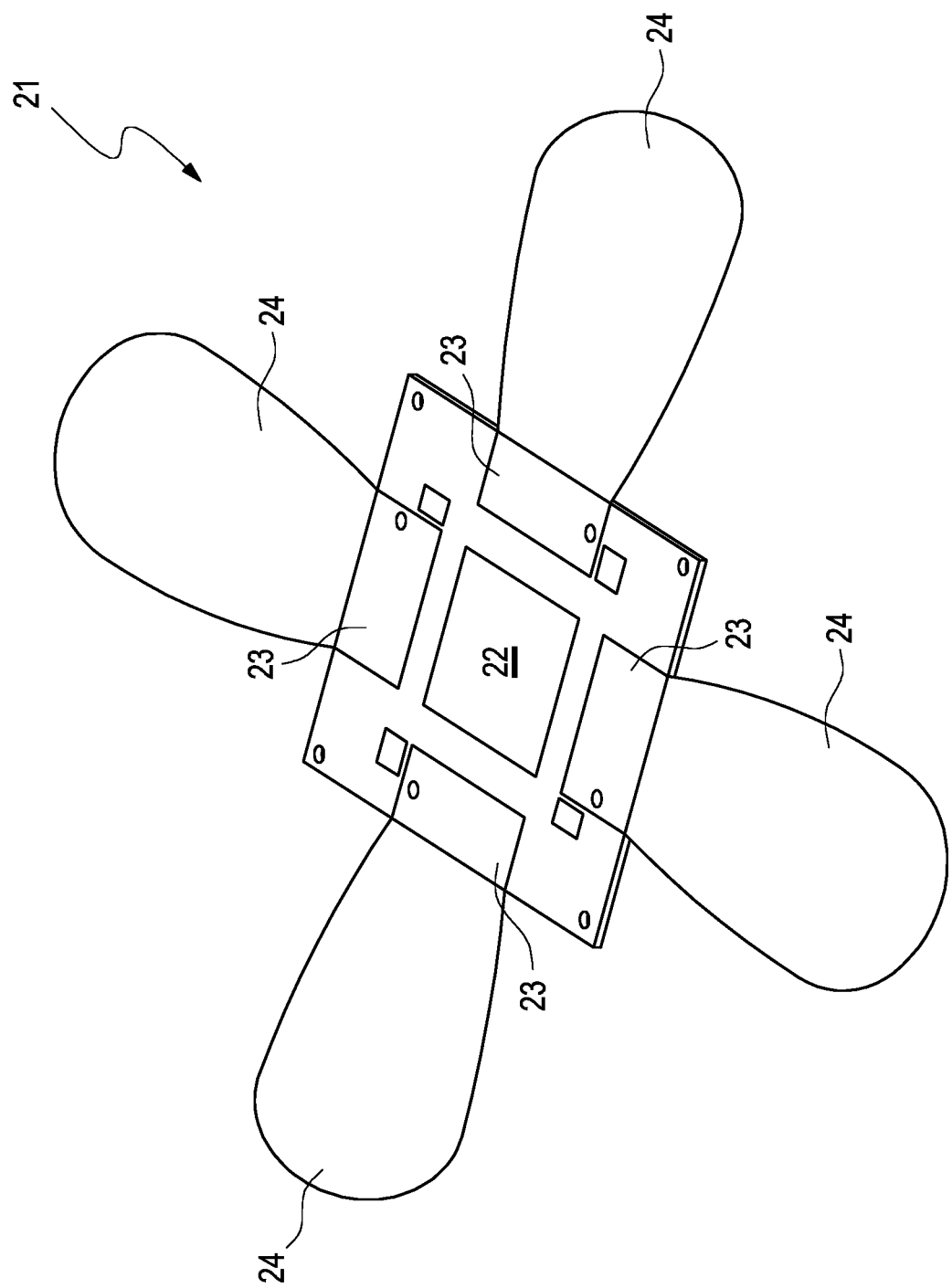
FIG. 3 shows a schematic drawing of the transceiver device of the arrangement of FIGS. 1 and 2.

An exemplary configuration of a transceiver device 21 is depicted in FIG. 3.

The transceiver device 21 comprises a memory and control module 22 which also has capabilities to connect to the wireless network established by the access points 9 as well as four transceiver antennae 23.

The four transceiver antennae 23 are UHF-antennae that may transmit and receive signals within their respective antenna lobes 24. The transceiver antennae 23 are all located in a common plane and each have a lateral expansion that is limited to less than 90 degrees. Since the antenna lobes 24 are furthermore oriented in 90 degree steps around the memory and control module 22, there is no risk of two antenna lobes 24 overlapping. The common plane is defined by the circuit board of the transceiver device 21 and due to the arrangement of the device 21 in the seat 3 to be assumed horizontal in the installed state.

In the memory and control module 22, a unique identifier 90 is stored. The memory and control module 22 to repeatedly and consecutively send a signal over each of the four transceiver antennae 23. The signal comprises the unique identifier 90 of the transceiver device 21 as well a unique identification 91 of the transceiver antenna 23 that is actually used for sending the signal in the respective instance.

At the same time the memory and control module 22 is configured to register any corresponding signal received by either one of the transceiver antennae 23. Apart from the information contained in the signal—i.e. the unique identifier 90 of and the identification 91 of the transceiver antenna 23 used for sending by a neighboring transceiver device 21—the memory and control module 22 registers the identification 91 of the transceiver antenna 23 actually having received said signal. This information together with its own unique identifier 90 is compiled to a pattern information pair 92 to be explained later in context with FIGS. 4 and 5. A pattern information pair 92 is created for every signal received whose signal strength is above a predetermined threshold. This way it is ensured that pattern information pairs 92 are only created for signals sent by close-by transceiver devices 21, which may be assumed to be neighboring transceiver devices 21.

The memory and control module 22 is also configured to send the created pattern information pairs 92 to a central instance 50 regularly, at certain predetermined events or on request by the central instance 50. The task of the central instance 50 will be explained later in regard to FIG. 5.

Figure 4:
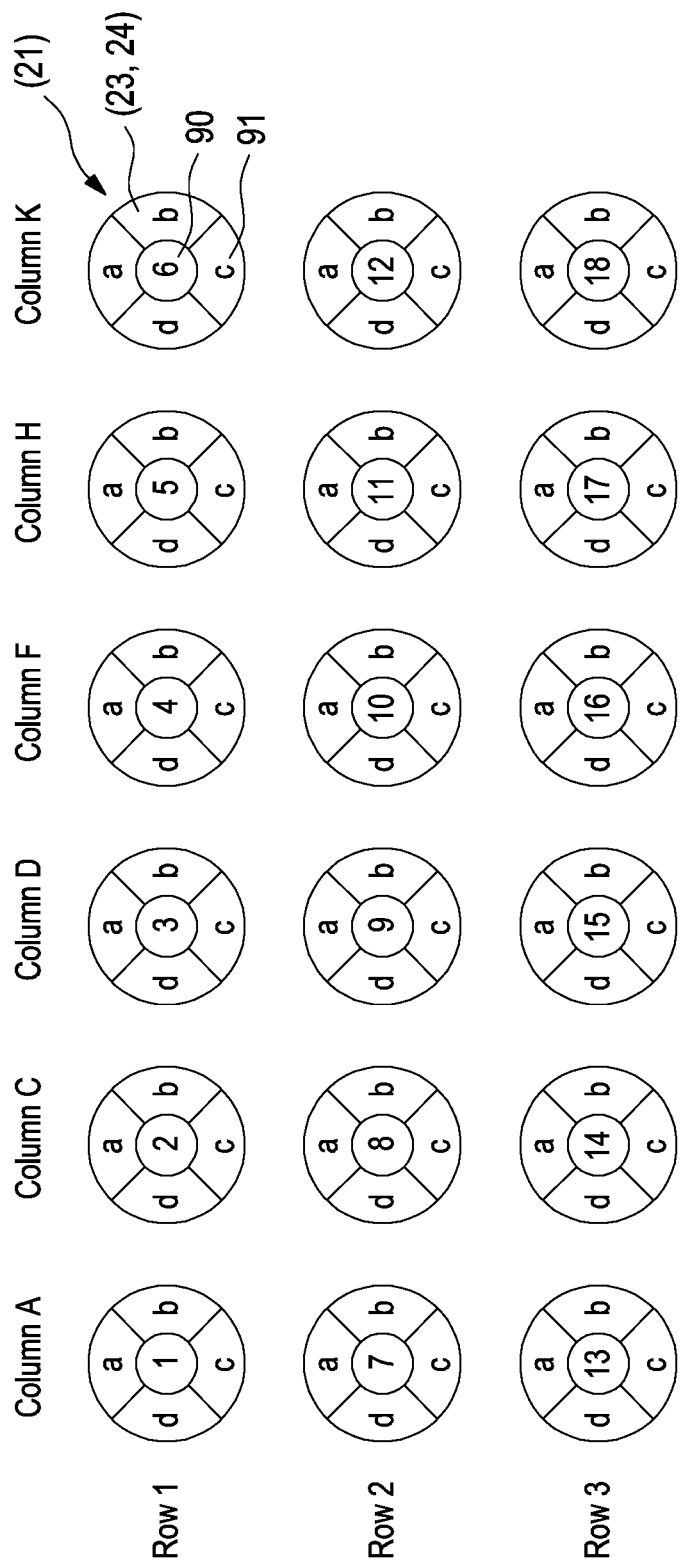
FIG. 4 shows a schematic illustration of interconnections between the various transceiver devices.

FIG. 4 is a schematic illustration of the interconnections between the various transceiver devices 21 of all the seats 3 in zone 6 of the cabin 2 as depicted in FIG. 1.

In FIG. 4, the transceiver devices 21 are depicted as circles with their unique identifier 90 shown in the center. Around the center are annular segments representing the transceiver antennae 23 and their antenna lobes 24, labelled with their respective identification 91. As can be gathered from FIG. 4, the identifications 91 of the transceiver antennae 23 of the transceiver devices 21 are aligned in that identification 91 "a" corresponds to a "forward" direction in view of the seat 3 when installed in the cabin 2, identification 91 "b" corresponds to "right", etc.

Looking more closely on the transceiver device 21 with the unique identifier 90 "1", for example, it may be noted that via the transceiver antennae 23 with identifications 91 "a" and "d" not signal of a neighboring transceiver device 21 will be received, while at the transceiver antennae 23 with identifications 91 "b" a signal transmitted by transceiver antennae 23 with identifications 91 "d" of the transceiver device 21 with the unique identifier 90 "2" is received—the latter information being easily decodable form the received signal. Similarly, at transceiver antennae 23 with identifications 91 "c" a signal of transceiver device 21 with the unique identifier 90 "7" is received, wherein the received signal will show that it was transmitted via transceiver antennae 23 with identifications 91 "a". The pattern information pairs that can thus be compiled as follows (zero stands for no signal received):

1-0
1b-2d
1c-7a
1d-0

Such pattern information pairs are compiled by each and every transceiver device 21 in zone 6 of the cabin 2 resulting in the data shown in FIG. 5, column "codes". In addition, in column "WAP" it is registered, to which access point 9 the individual transceiver devices 21 are wirelessly connected. This information can help to presort the transceiver devices 21 to their individual zone 6, 7, 8 which makes the allocation of the transceiver devices 21 to specific seat numbers and thus seats easier.

As already mentioned, the transceiver devices 21 send their pattern information pairs to a central instance 50. The central instance 50 has a stored pattern of the seats 3 installed in zone 6 of the cabin 2, i.e. the information of zone 6 comprising eighteen seats 3 in three rows and six columns as well as the individual seat numbers.

Analyzing the received pattern information pairs that can be assigned to zone 6, the central instance 50 will find the transceiver device 21 with the unique identifier 90 "1" having to belong to seat "1A" since it is the only transceiver device 21 having no neighbors to the front and left (cf. pattern information pairs "1a-0" and "1d-0"). Starting from this the transceiver device 21 allocated at seat "1C" can be determines by the pattern information pair "1a-2d" and confirmed by the pattern information pairs provided by the transceiver device 21 with the unique identifier "2", and so on.

Once the position of each transceiver device 21 is identified by having it mapped to the respective seat number, this information may then be used to address the equipment 10, 11 logically linked to the individual transceiver device 21 (see above). Thus is it possible to direct a command entered on the remote control 11, that by way of mapping can be assigned to the transceiver device 21 with the unique identifier 90 "7", which is in turn identified to be installed in the seat 3 with the number "2A", to the inflight entertainment module 10 installed in the seat 3 in front that is the seat 3 belonging to the transceiver device 21 with the unique identifier 90 "1", i.e. seat "1A".

Figure 6:
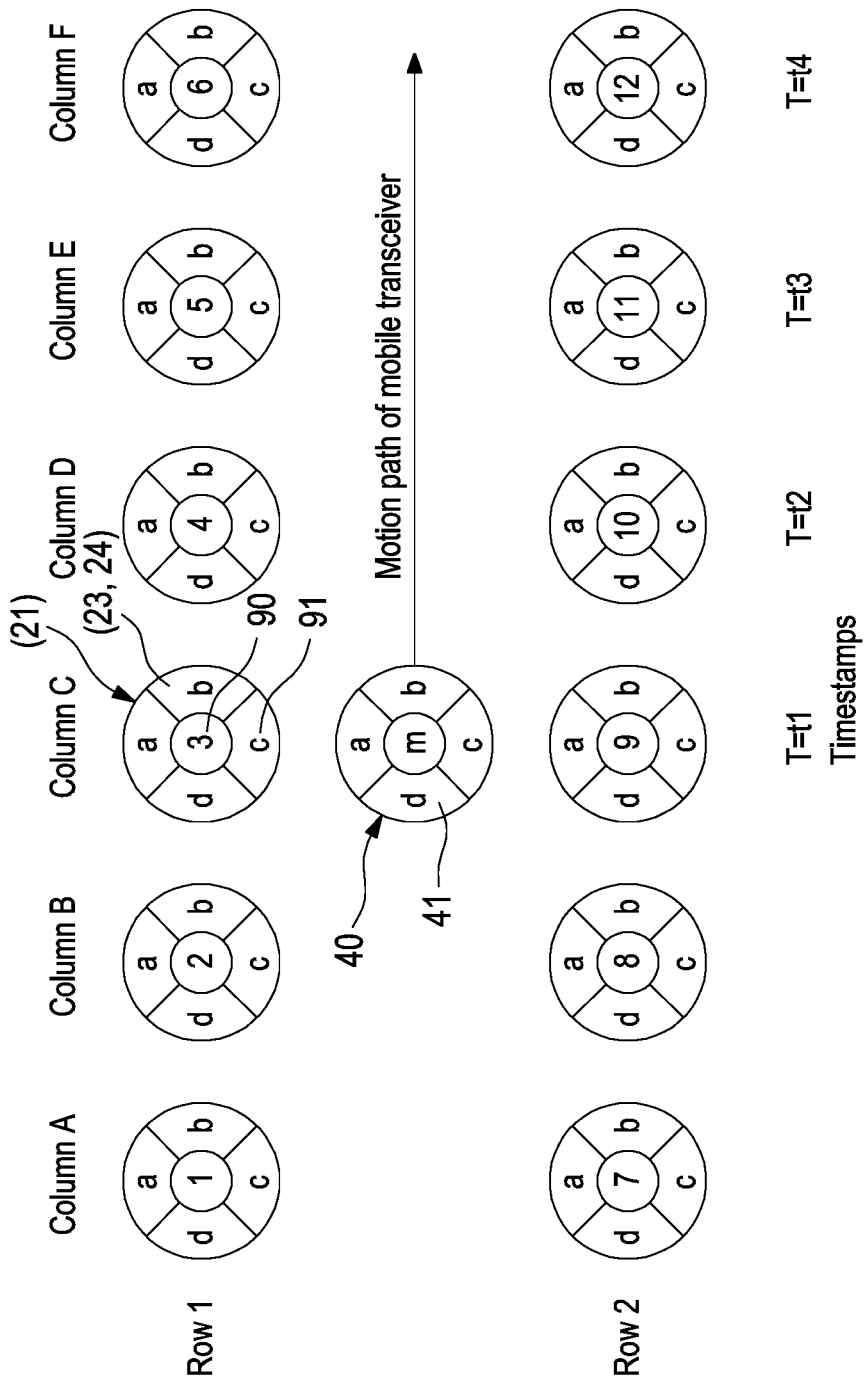
FIG. 6 shows a schematic illustration of locating using a portable device moving along a path.

FIG. 6 shows an exemplary schematic of locating a portable device 40 within a cabin 2 with transceiver device 21 at each seat 3 as described above. In this example, the position of each transceiver device 21 has already been identified as explained in context of FIGS. 4 and 5.

Even after their position having been identified, the transceiver device 21 continue to regularly send out signals comprising their unique identifier 90 via their transceiver antennae 23, identifiable by the identification 91 also contained in the signal.

The portable device 40—at least to the extent relevant here—is configured similarly to the transceiver device 21 in having four antennae 41, whose antenna lobes are oriented in 90 degree steps in a common plane, wherein the lateral expansion of the antenna lobes of each of the antennae is limited to 90 degrees. However, the antennae 41 of the portable device 40 may be receiving antennae only.

The portable device 40 also comprises a memory in which the determined transceiver devices' 21 positions and the pattern information pairs are locally stored.

When being moved around in the cabin 2, the portable device 40 receives the various signals transmitted by the transceiver devices 21 in its surroundings and can identify the direction they are coming from by recording which of its antennae 41 actually received a signal. Based on this input, the portal device 40 using the data stored in its memory can determine its position relative to the seats 3, which are clearly identifiably by means of their respective seat number also available to the portable device 40.

In FIG. 6, the portable device 40 is moved between rows "1" and "2" established by transceiver devices 21 whose location has been identified. The portable device 40 is moved from column "C" to column "F". The signals received at various times during this movement are shown in FIG. 6.

At time T=t1, there is no signal received by antennae 41 "m-b" and "m-d". However, by antennae 41 the signal from the antennae 23 with the identification "c" of transceiver devices 21 unique identifier 90 "3" is received. Similarly, the signal received by antennae 41 "m-c" may be abbreviated "9a". With the help of the data stored in its memory, the portable device 40 can determined its position to be between rows "1" and "2" at column "C".

The position information determined by the portable device 40 can be used for various applications that may also be executed on the portable device 40. For example, information about the seat 3 next to the portable device and/or the passenger booked for this seat 3 might be shown on a display.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An arrangement for addressing a plurality of equipment, the arrangement comprising the plurality of equipment, wherein:
   each one of the equipment is non-varyingly logically linked to a corresponding transceiver having a unique identifier and a plurality of transceiver antennae with non-identically oriented antenna lobes, wherein the corresponding transceiver is configured to transmit a signal comprising the unique identifier associated with the transceiver via each of the transceiver antennae individually and to receive any signal of a neighboring transceiver attributing it to the actually receiving transceiver antennae in order to determine pattern information pairs, and
   a central instance is configured to collect the pattern information pairs from the transceivers and to compare the pattern information pairs with a stored pattern of the equipment to identify each transceivers' position in the stored pattern.

2. The arrangement according to claim 1, wherein the transceivers are configured to transmit a signal consecutively via the different transceiver antennae and/or to add a unique identification of the transceiver antenna actually used for sending.

3. The arrangement according to claim 2, wherein the unique identification of at least one transceiver antenna reflects the assumed orientation of the transceiver.

4. The arrangement according to claim 1, wherein each of the transceivers has four antennae, whose antenna lobes are oriented in 90 degree steps in a common plane.

5. The arrangement according to claim 1, wherein at least one of the transceivers is configured to determine a signal strength of received signals, and configured to only determine pattern information pairs are for signals with relative maximum signal strength and/or with a signal strength above a predetermined threshold.

6. The arrangement according to claim 1, wherein at least some of the transceivers are configured to connect to a wireless network for data exchange and/or the transceivers are configured to establish a mesh network between the transceivers.

7. The arrangement according to claim 6, the arrangement further comprising an access point for establishing the wireless network, and at least for the transceivers having access to the wireless network, the signal strength at the access point is determined as an indication for the distance between the access point and the respective transceiver.

8. The arrangement according to claim 1, wherein the transceiver antennae are configured for a UHF-Band.

9. The arrangement according to claim 1, wherein the arrangement comprises a portable device configured to receive the signals transmitted by the transceivers and to match the received signals with the determined transceivers devices' positions and/or the pattern information pairs to determine the position of the portable device relative to the transceivers.

10. The arrangement according to claim 9, wherein the portable device has at least four antennae, whose antenna lobes are oriented in 90 degree steps in a common plane and/or perpendicular thereto.

11. The arrangement according to claim 10, wherein the portable device comprises a memory in which the determined transceivers' positions and/or the pattern information pairs are locally stored.

12. The arrangement according to claim 1, wherein the arrangement comprises a portable device configured to transmit a beacon signal to be received by the transceivers and the central instance is configured to determine the position of the portable device by analyzing which antenna of which transceiver received the beacon signal.

13. A method for addressing equipment, wherein each one of the equipment is non-varyingly logically linked to a transceiver having a unique identifier and a plurality of transceiver antennae with non-identically oriented antenna lobes, the method comprising:
   each of the transceivers transmitting a signal comprising its unique identifier via each of the transceiver antennae individually;
   each of the transceivers receiving signals of a neighboring transceiver and attributing it to the actually receiving transceiver antennae;
   each of the transceivers determining pattern information pairs based on the received signals;
   collecting the pattern information pairs from the plurality of transceivers; and
   comparing the pattern information pairs with a stored pattern of the equipment to identify each of the transceivers' position in the stored pattern.

14. The method according to claim 13 wherein the transceivers transmit a signal consecutively via the different transceiver antennae and/or adds a unique identification of the transceiver antenna actually used for sending.

15. The method according to claim 13, wherein at least one of the transceivers determines the signal strength of received signals and pattern information pairs are only determined for signals with relative maximum signal strength and/or with a signal strength above a predetermined threshold.

16. The arrangement according to claim 4, wherein the lateral expansion of the antenna lobes of each of the antennae is limited to 90 degrees.

\* \* \* \* \*